United States Patent [19]
LeBlanc

[11] Patent Number: 6,128,952
[45] Date of Patent: Oct. 10, 2000

[54] TIRE BALANCING USING GLASS BEADS

[76] Inventor: Roger LeBlanc, R.R.#1, Georgetown, Ontario, Canada, L7G 4S4

[21] Appl. No.: 09/207,021

[22] Filed: Dec. 8, 1998

Related U.S. Application Data

[63] Continuation-in-part of application No. 08/941,284, Sep. 30, 1997, abandoned.

[51] Int. Cl.[7] .............................. G01M 1/16; B60C 19/00
[52] U.S. Cl. ........................ 73/460; 301/5.22; 152/154.1
[58] Field of Search .................... 73/66, 460; 152/154.1; 252/1; 501/32, 33; 156/75; 301/5.22

[56] References Cited

U.S. PATENT DOCUMENTS

| | | |
|---|---|---|
| 3,463,551 | 8/1969 | Clay . |
| 3,747,660 | 7/1973 | Tibbals . |
| 4,179,162 | 12/1979 | Zarlengo ..................................... 301/5 |
| 5,073,217 | 12/1991 | Fogal . |
| 5,083,596 | 1/1992 | Kato et al. . |
| 5,728,243 | 3/1998 | Heffernan et al. . |
| 5,766,501 | 6/1998 | Heffernan et al. . |

OTHER PUBLICATIONS

Article from Commercial Carrier Journal, Mar. 1997 titled "Keeping Your Balance" by Rich Cross.
Advertisement, Nov. 1996, titled "Magnum Bulletin".

*Primary Examiner*—Richard A. Moller
*Attorney, Agent, or Firm*—R. Craig Armstrong

[57] ABSTRACT

A tire balancing material made of glass beads and methods to balance tire using the same are disclosed. The glass bead material either in a loose format or a sealed pressurized package is introduced into an imbalanced tire. The motion of the imbalanced tire encourages the glass bead material to migrate to areas of the inside tire lining so as to correct the imbalance. Once the tire is balanced, the glass bead material migration comes to a general stop and generally remain there on the inside tire lining despite the vehicle coming to a stop and/or recommencing motion. The invention utilizes a dielectric material, such as glass beads, which charges and remains in place against the tire lining by electrostatic attraction.

17 Claims, 6 Drawing Sheets

| APPLICATION CHART |||||||
|---|---|---|---|---|---|
| Tire Size | Single Wheel Position | Dual Wheel Position | Tire Size | Single Wheel Position | Dual Wheel Position |
| 31/10.50 R15 | 3 oz or 85 g | | 195/60 R17.5 | 3 oz or 85 g | 3 oz or 85 g |
| 31/11.50 R15 | 3 oz or 85 g | | 205/60 R17.5 | 3 oz or 85 g | 3 oz or 85 g |
| 31/12.50 R15 | 4 oz or 113 g | | 225/60 R17.5 | 3 oz or 85 g | 3 oz or 85 g |
| 32/12.50 R15 | 4 oz or 113 g | | 8 R17.5 | 4 oz or 113 g | 4 oz or 113 g |
| 33/12.50 R15 | 4 oz or 113 g | | 8.5 R17.5 | 6 oz or 170 g | 6 oz or 170 g |
| 35/12.50 R15 | 5 oz or 142 g | | 9 R17.5 | 6 oz or 170 g | 6 oz or 170 g |
| 35/12.50 R16.5 | 5 oz or 142 g | | 10 R17.5 | 8 oz or 227 g | 8 oz or 227 g |
| 37/12.50 R16.5 | 5 oz or 142 g | | 11R17.5 | 8 oz or 227 g | 8 oz or 227 g |
| | | | 195/70 R17.5 | 4 oz or 113 g | 4 oz or 113 g |
| 195/65 R16 | 3 oz or 85 g | 3 oz or 85 g | 215/70 R17.5 | 4 oz or 113 g | 4 oz or 113 g |
| 225/75 R16 | 3oz or 85 g | 3 oz or 85 g | 235/70 R17.5 | 4 oz or 113 g | 4 oz or 113 g |
| 245/75 R16 | 3oz or 85 g | 3 oz or 85 g | 205/75 R17.5 | 4 oz or 113 g | 4 oz or 113 g |
| 265/75 R16 | 3 oz or 85 g | 3 oz or 85 g | 215/75 R17.5 | 6 oz or 170 g | 6 oz or 170 g |
| 285/75 R16 | 3 oz or 85 g | 3 oz or 85 g | 225/75 R17.5 | 6 oz or 170 g | 6 oz or 170 g |
| 215/85 R16 | 3 oz or 85 g | 3 oz or 85 g | 235/75 R17.5 | 6 oz or 170 g | 6 oz or 170 g |
| 225/85 R16 | 3 oz or 85 g | 3 oz or 85 g | 205/80 R17.5 | 4 oz or 113 g | 4 oz or 113 g |
| 235/85 R16 | 3 oz or 85 g | 3 oz or 85 g | 225/80 R17.5 | 4 oz or 113 g | 4 oz or 113 g |
| 245/85 R16 | 3 oz or 85 g | 3 oz or 85 g | 225/90 R17.5 | 6 oz or 170 g | 6 oz or 170 g |
| 255/86 R16 | 4 oz or 113 g | 4 oz or 113 g | | | |
| 265/85 R16 | 4 oz or 113 g | 4 oz or 113 g | 7.50 R18 | 8 oz or 227 g | 8 oz or 227 g |
| | | | 8 R19.5 | 6 oz or 170 g | 8 oz or 227 g |
| 7.50 R16 | 3 oz or 85 g | 3 oz or 85 g | 9 R19.5 | 6 oz or 170 g | 8 oz or 227 g |
| 8.00 R16.5 | 3 oz or 85 g | 3 oz or 85 g | 18 R19.5 | 14 oz or 397 g | |
| 8.75 R16.5 | 3 oz or 85 g | 3 oz or 85 g | 225/70 R19.5 | 6 oz or 170 g | 8 oz or 227 g |
| 9.50 R16.5 | 3 oz or 85 g | 3 oz or 85 g | 245/70 R19.5 | 6 oz or 170 g | 8 oz or 227 g |

Fig. 4

| APPLICATION CHART |||||||
|---|---|---|---|---|---|
| Tire Size | Single Wheel Position | Dual Wheel Position | Tire Size | Single wheel Position | Dual Wheel Position |
| 265/70 R19.5 | 6 oz or 170 g | 8 oz or 227 g | 255/80 R22.5 | 8 oz or 227 g | 10 oz or 283 g |
| 275/70 R19.5 | 8 oz or 227 g | 10 oz or 283 g | 275/80 R22.5 | 10 oz or 283 g | 12 oz or 340 g |
| 285/70 R19.5 | 8 oz or 227 g | 10 oz or 283 g | 295/80 R22.5 | 12 oz or 340 g | 14 oz or 397 g |
| 305/70 R19.5 | 10 oz or 282 g | 12 oz or 340 g | 315/80 R22.5 | 12 oz or 340 g | |
| 280/75 R19.5 | 8 oz or 227 g | 10 oz or 283 g | 365/80 R22.5 | 12 oz or 340 g | |
| 445/65 R19.5 | 14 oz or 397 g | | 385/65 R22.5 | 12 oz or 340 g | |
| | | | 425/65 R22.5 | 14 oz or 397 g | |
| 525/65 R20.5 | 18 oz or 510 g | | 445/65 R22.5 | 16 oz or 454 g | |
| 615/65 R20.5 | 20 oz or 566 g | | 15 R22.5 | 12 oz or 340 g | |
| 9 R22.5 | 8 oz or 227 g | 10 oz or 283 g | 16.5 R22.5 | 14 oz or 397 g | |
| 10 R22.5 | 8 oz or 227 g | 10 oz or 283 g | 18 R22.5 | 16 oz or 454 g | |
| 11 R22.5 | 10 oz or 282 g | 12 oz or 340 g | | | |
| 12 R22.5 | 12 oz or 340 g | 14 oz or 397 g | 285/75 R24.5 | 10 oz or 283 g | 12 oz or 340 g |
| 275/50 R22.5 | 10 oz or 282 g | 12 oz or 340 g | 305/75 R24.5 | 10 oz or 283 g | 12 oz or 340 g |
| 235/70 R22.5 | 6 oz or 170 g | 8 oz or 227 g | 315/75 R24.5 | 10 oz or 283 g | 12 oz or 340 g |
| 255/70 R22.5 | 8 oz or 227 g | 10 oz or 283 g | 275/80 R24.5 | 10 oz or 823 g | 12 oz or 340 g |
| 11/70 R22.5 | 8 oz or 227 g | 10 oz or 283 g | 295/80 R24.5 | 10 oz or 283 g | 12 oz or 340 g |
| 265/70 R22.5 | 8 oz or 227 g | 10 oz or 283 g | 11 R24.5 | 10 oz or 283 g | 12 oz or 340 g |
| 275/70 R22.5 | 10 oz or 283 g | 12 oz or 340 g | 12 R24.5 | 14 oz or 397 g | 14 oz or 397 g |
| 305/70 R22.5 | 10 oz or 283 g | 12 oz or 340 g | | | |
| 365/70 R22.5 | 12 oz or 340 g | | 8.25 R20 | 8 oz or 227 g | 10 oz or 283 g |
| 315/70 R22.5 | 10 oz or 283 g | 12 oz or 340 g | 9.00 R20 | 10 oz or 283 g | 12 oz or 340 g |
| 245/75 R22.5 | 8 oz or 227 g | 10 oz or 283 g | 10.00 R20 | 10 oz or 283 g | 12 oz or 340 g |
| 265/75 R22.5 | 8 oz or 227 g | 10 oz or 283 g | 11.00 R20 | 12 oz or 340 g | 14 oz or 397 g |
| 285/75 R22.5 | 10 oz or 283 g | 12 oz or 340 g | 12.00 R20 | 12 oz or 340 g | 14 oz or 397 g |
| 295/75 R22.5 | 10 oz or 283 g | 12 oz or 340 g | 13/80 R20 | 12 oz or 340 g | 14 oz or 397 g |
| 315/75 R22.5 | 10 oz or 283 g | | 14/80 R20 | 12 z or 340 g | 14 oz or 397 g |
| 345/75 R22.5 | 12 oz or 340 g | | 14.00 R20 | 16 oz or 454 g | 16 oz or 454 g |
| 350/75 R22.5 | 14 oz or 397 g | | | | |
| 235/80 R22.5 | 6 oz or 170 g | 8 oz or 227 g | | | |

Fig. 5

TIRE BALANCING USING GLASS BEADS

This application is a continuation-in-part of U.S. patent application Ser. No. 08/941,284 filed Sep. 30, 1997 now abandoned. As such, the benefit of the earlier filed application is therefore being claimed.

BACKGROUND OF THE INVENTION

1. Field of the Invention

This invention relates to materials used to balance tires.

2. Description of the Prior Art

Tire balance is important for vehicle ride and stability and for customer satisfaction as well. Tires, wheels, rims, brake drums, rotors and hubs are all manufactured to a close tolerance for roundness, shape and balance. By assembling all these tolerances together, the probability of this assembly being out of balance is high. Wheel imbalance causes forces that result in vibration through the vehicle's steering, suspension and body. Imbalance is the cause of the majority of vibration complaints.

One method of solving tire imbalance is to use a free-flowing balancing material within the imbalanced tire. The material is first introduced at mounting or a mounted tire. The tire retains proper balance simply because the free-flowing material, the minuscule individual elements making up the material, inside the tire are distributed in such a way that evens out the heavy spot in the tire assembly. Glycol and fibres were first used about thirty years ago.

In the case of a rotating tire and wheel, a heavy spot creates a force away from the tire, but because it is anchored by the axle, an opposite force is created within the tire as the forces flexes the suspension. This will draw a sufficient quantity of the balancing material in the direction of the opposite force until the heavy spot is neutralized. In currently available material, the remaining balancing material spreads itself evenly around the inside of the tire, the material then remains in place. When the vehicle stops, the conventional material falls away from its neutralizing position on the liner and falls to the bottom of the tire, and returns to a neutralizing position when the vehicle re-commences motion at highway speeds. Therefore, the whole process of re-balancing must recommence after every stop.

U.S. Pat. No. 5,766,501 to Heffernan et al. is one such traditional balancing material that works in the conventional manner described above. In this disclosure, Heffernan teaches a balancing material having a composition to reduce friction of the overall balancing material to ensure the material retains free-flowing characteristics when installed into a tire. The composition disclosed therein still, however, has undesirable qualities.

Unfortunately, this constant "on the liner" and "off the liner" motion of conventional balancing materials has problems; for instance, some of the currently available balancing materials deteriorate through this constant "on"-"off" motion into dust particles. This deterioration causes mounting and dismounting problems for tire installers as the resulting dust is undesirable because the dust leaves a coat on the wheel and the tire mounting surface. Further still, the deterioration clogs the tire valve seat thereby causing an air leak. The end result is that conventional balancing materials do not produce a constant balanced tire as they have to recommence the re-balancing process after every stop. During the gradual time the material is relocating to or from the balancing positions, the tire is out of balance.

Another problem that exists with currently available balancing materials is that the materials are abrasive in nature. The abrasive characteristic of currently available materials along with the on and off the liner action of the materials causes undesirable wearing down from the inside of the tire. The absorption of moisture is another problem facing currently available materials. By the dust absorbing moisture these materials clump together. As a result of this moisture clumping, conventional materials tend not to position themselves in correct neutralizing/counterbalancing positions. Further still, another problem encountered with some currently available materials is that the materials sometimes react to the alloyed wheels. One such traditional material has brass tracings that react to aluminum wheels.

Therefore, there exists a need to provide an alternative balancing material to overcome some of the drawbacks of currently available materials.

SUMMARY OF THE INVENTION

It is an object of the invention to overcome some the drawbacks of the currently available balancing materials.

It is another object of the invention to provide a balancing material having little moisture absorption characteristics.

It is another object of the invention to provide a balancing material having low deterioration characteristics.

It is another object of the invention to provide a balancing material having a non-abrasive characteristics when in use within a tire.

It is another object of the invention to provide a balancing material not having an adverse reaction to contact with metal or rubber.

It is another object of the invention to provide a dielectric material which charges and remains in place by electrostatic attraction.

Therefore, according to the present invention, there is provided a tire balancing material made up of glass beads. The glass bead material is introduced into an imbalanced tire. The motion of the imbalanced tire encourages the glass bead material to migrate to areas of the inside tire lining so as to correct the imbalance. Once the tire is balanced, the glass bead material migration come to a general stop and generally remain clinging to those area(s) against the tire liner despite the vehicle coming to a stop and/or recommencing motion.

In another embodiment of the present invention, there is disclosed a method of correcting the imbalance in a wheel assembly, said method comprising the steps of: (a) introducing into a well of a tire prior to the tire being mounted at least one pressurized sealed package containing therein a predetermined amount of glass beads; (b) inflating the tire to a desired pressure level and such a way so as to break open said sealed package whereby said glass beads are released into the tire well; and (c) setting in motion the tire whereby the released glass beads migrate within the inner periphery of the tire and come to a stop on the lining of the tire at a position or positions so as to counterbalance the imbalance in the wheel assembly.

Furtherfeatures of the invention will be described orwill become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 4 is an application chart for the glass beads;

FIG. 5 is an application chart (a continuation of FIG. 4) for the glass beads.

DETAILED DESCRIPTION OF THE PREFERRED EMBODIMENT

Figure 1:
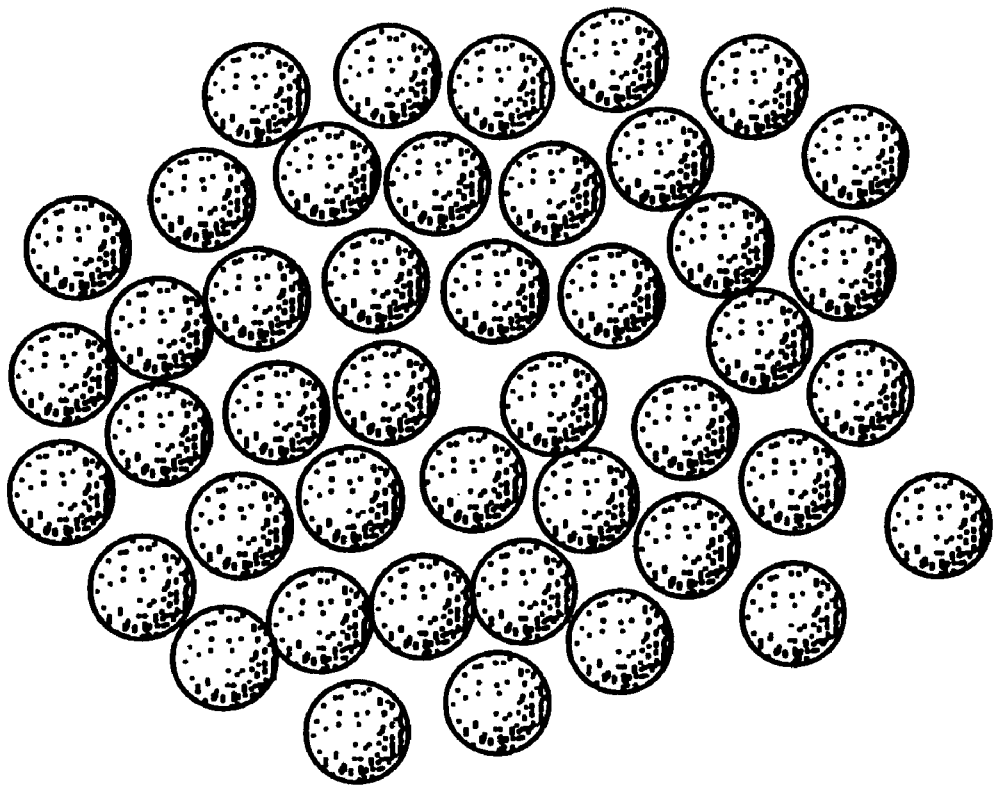
FIG. 1 is an enlarged view of the glass beads.

The accompanying drawings illustrate the invention. With reference to FIG. 1, the tire balancing beads are preferably spherical in shape. The glass beads 1, which are initially free-flowing, are introduced into the hollow interior of the tire 2 by one of five methods.

In the first method, a desired amount of glass beads may be poured into the tire well before the tire is mounted onto the wheel (not shown). The tire is then inflated after mounting.

Figure 2:
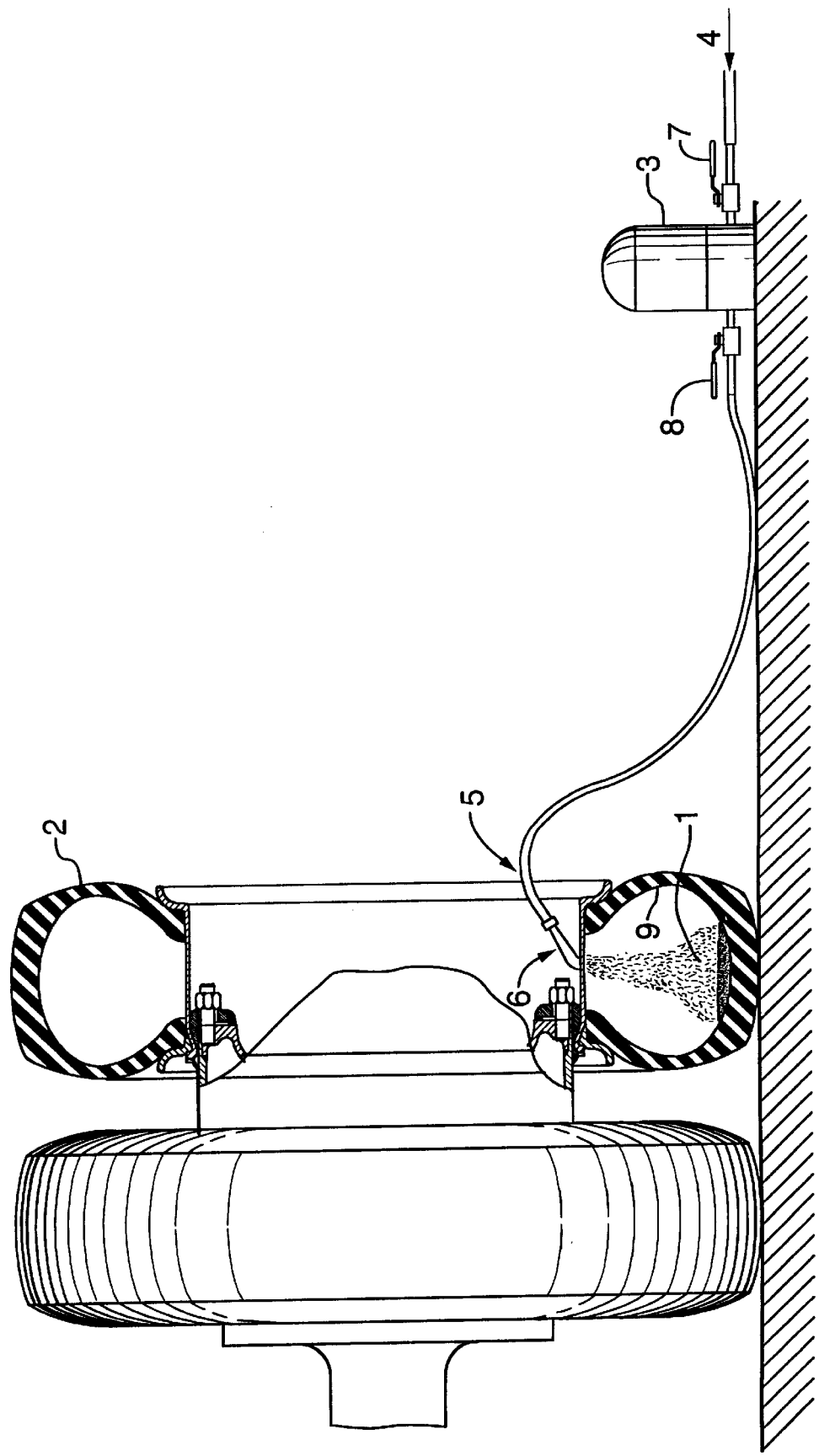
FIG. 2 is a cross-sectional view of a tire with the glass beads being injected inside of the tire.

In the second method, as shown in FIG. 2, a pre-mounted tire is half deflated, and an in-line applicator tool 3 is filled with the desired amount of the glass bead material. The in-line applicator tool 3 is flipped upside down. The air intake end 4 is connected to a typical pressurized tire air supply. The air exit 5 is connected to the tire valve 6 connector. Valve 7 is opened thereby pressurizing the material housing. Valve 8 is subsequently opened. Approximately thirty seconds later the glass bead material is completely injected into the tire. The tire may then continue to be inflated to a desired tire pressure, for instance up to 150 psi.

In the third, fourth, and fifth methods, a slightly pressurized sealed package (approximately 0.5 psi) containing the predetermined amount of the balancing material is placed into the tire well/cavity of a tire prior to mounting the tire. The package is, preferably, potato chip bag-like in shape. The tire containing the package therein is then inflated to a desired pressure. Since the pressure in the inflated tire is much higher (i.e. 25 to 150 psi) than the package, the package will burst or collapse under pressure and release the balancing material into the tire. To assure the collapse of the package and the release of the balancing material, rapid inflation of the tire is desired. In a preferred embodiment, an air bead blaster is utilized to pressurize and seat the tire. The bursted package and balancing material would then be forced to the inside liner of the tire through centrifugal force, as described below, as the tire begins to roll. Methods three through five are ideally suited for use in situations where there is a high volume of tires to be balanced and the completion time for installing the balancing material is important, such as in OEM assembly lines and/or where the use of air bead blaster is utilized to inflate a tire from the bead seating area of the tire. Methods three and four differ in the choice of packaging material used.

In the third method, a polyvinyl chloride package having a high contact electrification allowing it to also cling to the inside liner of the tire is used. In a preferred embodiment, the polyvinyl chloride packaging would be made from one thousandths of an inch thick material. Due to the relatively high running temperature of the tire the package will eventually shrink and dissolve while the balancing material is still effective in balancing the tire.

In contrast, the fourth method uses a package made of 250 cello (cellophane) that eventually breaks down into a dust. This latter method is not as desirable as the third method, because as previously mentioned dust is not desirable. Dust would then call for a valve filter to be used.

In the fifth method, the packaging is made from polyethylene, preferably one thousandths of an inch in thickness. In this embodiment of the invention, the package material shrinks, and bonds to the tire lining with the combination of centrifugal force and heat.

Other packaging materials would also be suitable so long as the proposed material breaks down or bonds with the lining of the tire without leaving substantial dust particles and is environmentally friendly.

Figure 3:
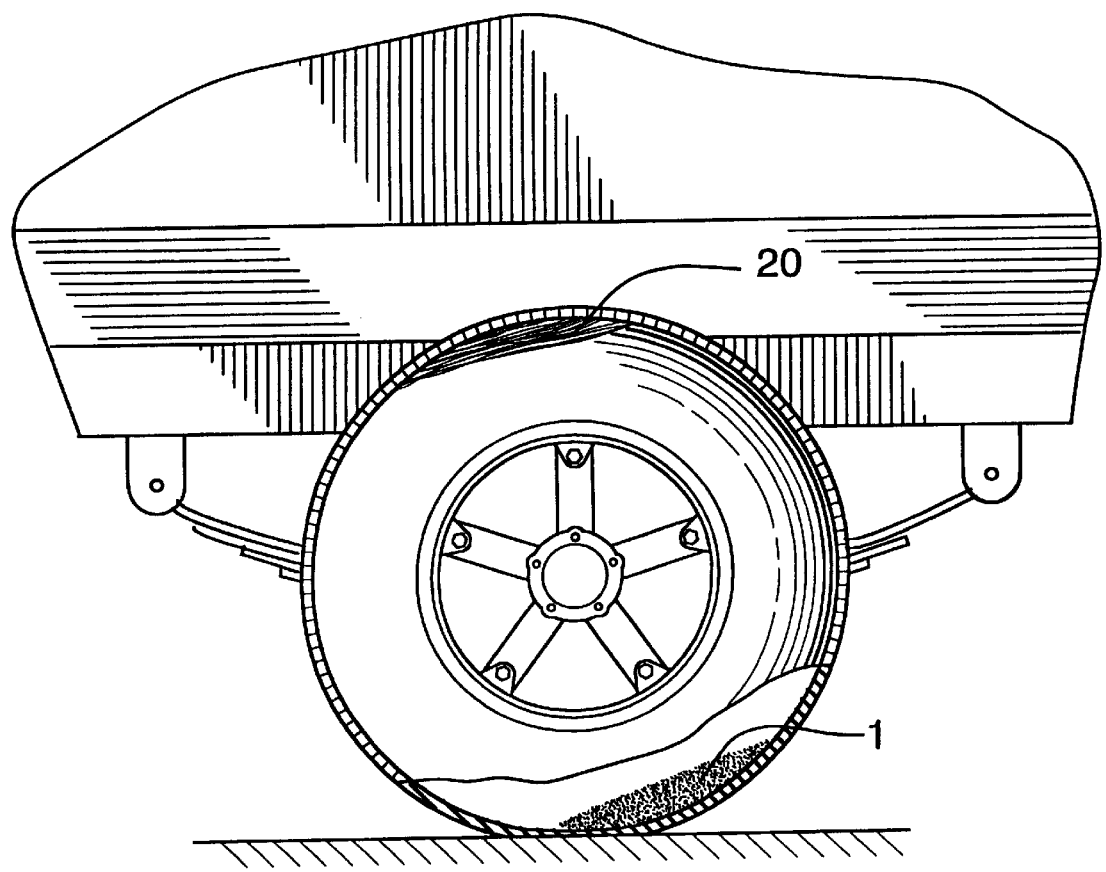
FIG. 3 is a side view of a wheel assembly illustrating a heavy spot and the approximate location of the counterbalancing glass beads.
Figure 6:
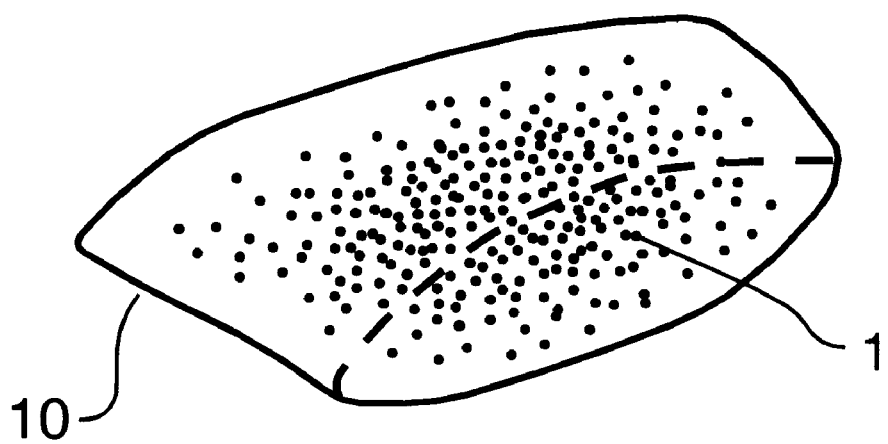
FIG. 6 is a view of a sealed package containing the glass beads.

The application amount of the glass beads varies according to the size of the tire. The preferred amounts for the glass beads for various tire sizes are set out in FIGS. 4 and 5. In general, for every thirteen pounds of tire, one ounce of glass beads should be introduced into the tire. A typical car tire will weigh about 30 pounds while a light truck tire will weigh 40 to 50 pounds and a medium truck tire will weigh about 90 to 130 pounds. It should be noted that up to twice the suggested amount may be used where necessary to balance the tires. When the tire is inflated and is set in motion the glass beads migrate within the tire so as to balance any imbalance in the tire. Unlike the prior art, the glass beads are smooth and have no sharp edges (as shown in FIG. 1). Therefore, the glass beads are, advantageously, non-abrasive against the inside liner of the tire. Moreover, the material characteristics of the glass bead balancing material does not allow for moisture absorption. Advantageously, moisture clumping of the material due to moisture accumulation therein does not occur. The glass beads after installation and during the initial rotations of the tire will charge by tribo- or contact electrification during contact between the glass beads and the rubber of the tire. Because of the conductivity of the rubber any charge on the tire will be quickly dissipated. However, because of the high surface resistivity of the glass beads, the charge will remain on the glass beads for long periods of time. The result is that the glass beads cling against the lining of the tire at the neutralizing balanced positions. This overall clinging effect is referred as "electrostatic cling". The result is that glass beads do not disengage from the lining whenever the tire stops motion because of the image force between the charge on the beads and an opposite induced in the rubber of the tire. The inventor has discovered that when the tire is dismounted the glass beads remain flush against the lining. When the installer strikes the tire or a sudden shock is felt by the tire then only will the glass beads disengage from the lining and fall free. For illustrative purposes FIG. 3 shows a shaded heavy spot 20 and the approximate location of the glass beads 1 to counterbalance the imbalance in the wheel assembly. The heavy spot 20 on the wheel assembly results in a centrifugal "G" force which compresses the suspension springs of the vehicle creating an up and down bouncing effect (a vibration). This constant force is enough to move the beads in the opposite direction of the heavy spot through inertia until it has counteracted the imbalance and the glass beads hold their position, this latter feature is referred herein as electrostatic cling. This electrostatic cling characteristic of the glass beads constitutes a major deviation from traditional balancing materials. First, some traditional balancing materials having a composition of materials that inherently prevent electrostatic cling from occurring—thus these traditional balancing materials remain free-flowing. In complete contrast, the present invention inventively and novelly utilizes the electrostatic cling effect to produce some of the advantages described above that flow from this glass bead balancing material. This electrostatic cling prevents substantial wear and tear on the material by reason of not having to continually go through re-balancing after each stopped position of the vehicle and provides less wear and tear on the vehicle itself, less vibration, a smoother ride resulting in a safer vehicle, and a constantly balanced tire at all speeds.

Advantageously, the glass beads do not react to any metal or alloyed metal wheel. Five to twenty-five thousands of an inch is the approximate desirable size of the glass beads. The very good durability characteristics of the glass beads leads to little deterioration of the material into dust particles. This in turn reduces the possibility of the tire valve seat from clogging. Moreover, the present invention is environmentally friendly. Unlike some traditional lead-based balancing materials, escape or release of the glass beads into the environment will not be detrimental thereto.

Additionally, the glass bead balancing material has shock absorbing characteristics. The inventor, has observed that with the glass bead material installed, the bumpy ride from a rough road or tight turns a noticeable reduction of vibration. Silicone may be added to the glass beads as a lubricant. The amount of the silicone lubricant added to the glass beads can be adjusted to vary the strength of the electrostatic cling effect. It has been found that 0–1% by volume is ideal for medium truck tires. The preferred embodiment of the invention has the composition to be 99% glass beads and 1% silicone lubricant.

For passenger and light truck soft suspension vehicles, the inventor has found that the vehicle must be driven at highway speeds for approximately one kilometre immediately after installation of the present invention. This will enable the balancing material to stabilize in a balanced position with electrostatic cling taking effect. With medium or large trucks with heavy suspension, it is not necessary to take the vehicles for an immediate highway run after installation as the heavy suspension will facilitate the re-adjustment of the balancing material to its balancing positions.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, an alternative mixture having glass beads as one of its components is a possible. In addition, an alternative size for the glass beads may be used.

What is claimed as the invention is:

1. A vehicle tire balancing material for injecting into the interior of a tire for correcting any imbalance therein, consisting only of glass beads and up to about 1% by volume of lubricant.

2. A balancing material as claimed in claim 1, wherein said lubricant is silicone.

3. A balancing material as claimed in claim 2, wherein said glass beads are rounded in shape.

4. A balancing material as claimed in claim 3, wherein said glass beads are primarily in the range between five to twenty-five thousands of an inch in diameter.

5. A balancing material as claimed in claim 3, wherein the balancing material comprises:

(a) 99% of glass beads, and
    (b) 1% of silicone lubricant.

6. A method of correcting the imbalance in a wheel assembly comprising the steps of:

(a) injecting a desired amount of a balancing material consisting essentially of glass beads into the hollow interior of a stationary tire mounted to a wheel rim,
    (b) pressurizing the air in the tire to a desired level, and
    (c) setting the tire in motion, whereby the glass beads migrate within the interior of the tire and come to a stop on the lining of the tire at a position or positions so as to counterbalance the imbalance in the wheel assembly, and wherein a substantial portion of said glass beads remain at those positions by electrostatic cling.

7. The method claimed in claim 6, wherein the desired amount of glass beads is approximately in the range of one ounce of beads for every thirteen pounds of weight of the tire.

8. A method of correcting the imbalance in a wheel assembly, said method comprising the steps of:

(a) introducing a predetermined amount of glass beads into the tire well of an unmounted stationary tire,
    (b) mounting the tire,
    (c) pressurizing the air in the tire to a desired level, and
    (d) setting in motion the tire, whereby the glass beads migrate within the interior of the tire and come to a stop on the lining of the tire at a position or positions so as to counterbalance the imbalance in the wheel assembly.

9. The method claimed in claim 8, wherein the desired amount of glass beads is approximately in the range of one ounce of beads for every thirteen pounds of tire.

10. A method of correcting the imbalance in a wheel assembly comprising the steps of:

(a) introducing into a well of a tire prior to the tire being mounted at least one pressurized sealed package containing therein a predetermined amount of glass beads,
    (b) inflating the tire to a desired pressure level in (and) such a way so as to break open said sealed package whereby said glass beads are released into the tire well, and
    (c) setting in motion the tire whereby the released glass beads migrate within the inner periphery of the tire and come to a stop on the lining of the tire at a position or positions so as to counterbalance the imbalance in the wheel assembly.

11. A method of balancing a wheel assembly as claimed in claim 10, wherein said inflation step is achieved by an air bead blaster device.

12. A method of balancing a wheel assembly as claimed in claim 11, wherein the package material comprises polyvinyl chloride material.

13. A method of balancing a wheel assembly as claimed in claim 11, wherein the package material comprises cellophane material.

14. A method of balancing a wheel assembly as claimed in claim 11, wherein the package material comprises polyethylene material.

15. A vehicle tire balancing material for injecting into the interior of a tire for correcting any imbalance therein, consisting entirely of glass beads.

16. A balancing material as claimed in claim 15, wherein said glass beads are rounded in shape.

17. A balancing material as claimed in claim 16, wherein said glass beads are primarily in the range between five to twenty-five thousands of an inch in diameter.

* * * * *